(12) United States Patent
Demissie et al.

(10) Patent No.: US 11,927,176 B2
(45) Date of Patent: Mar. 12, 2024

(54) BEARING ARRANGEMENT FOR A WIND TURBINE AND WIND TURBINE

(71) Applicant: Siemens Gamesa Renewable Energy A/S, Brande (DK)

(72) Inventors: Edom Demissie, Sheffield (GB); Claus Michaelsen, Herning (DK); Morten Soerensen, Horsens (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 1 day.

(21) Appl. No.: 17/015,128

(22) Filed: Sep. 9, 2020

(65) Prior Publication Data
US 2021/0079899 A1   Mar. 18, 2021

(30) Foreign Application Priority Data

Sep. 16, 2019 (EP) .................................... 19197448

(51) Int. Cl.
*F03D 80/70* (2016.01)
*F03D 9/25* (2016.01)
(Continued)

(52) U.S. Cl.
CPC ............... *F03D 80/70* (2016.05); *F03D 9/25* (2016.05); *F03D 13/40* (2016.05); *F03D 80/703* (2023.08);
(Continued)

(58) Field of Classification Search
CPC .......... F03D 80/70; F03D 80/80; F03D 13/40; F05B 2240/60; F05B 2240/61; F05B 2240/14
See application file for complete search history.

(56) References Cited

U.S. PATENT DOCUMENTS

| 7,385,305 B2 * | 6/2008 | Casazza | F03D 80/40 416/61 |
| 8,734,105 B2 * | 5/2014 | Wadehn | F16C 33/1045 416/174 |

(Continued)

FOREIGN PATENT DOCUMENTS

| CN | 102840105 A | 12/2012 |
| CN | 109424494 A | 3/2019 |

(Continued)

OTHER PUBLICATIONS

European Search Report and Written Opinion of the European Searching Authority dated Mar. 19, 2020 Application No. 19197448.4.

*Primary Examiner* — Christopher Verdier
*Assistant Examiner* — Michael K. Reitz
(74) *Attorney, Agent, or Firm* — Schmeiser, Olsen & Watts, LLP

(57) ABSTRACT

Provided is a bearing arrangement for a wind turbine including a bearing housing and a drive shaft, whereby the drive shaft is arranged within the bearing housing in an axial direction along a longitudinal axis of the bearing housing, the bearing arrangement further comprising a downwind bearing and an upwind bearing as radial fluid bearings, whereby the downwind bearing and the upwind bearing are arranged between the bearing housing and the drive shaft, whereby the bearing housing is formed from at least two separate bearing housing pieces, whereby the at least two separate bearing housing pieces are joined with each other and/or the drive shaft is formed from at least two separate drive shaft pieces, whereby the at least two separate drive shaft pieces are joined with each other.

7 Claims, 5 Drawing Sheets

(51) Int. Cl.
*F03D 13/40* (2016.01)
*F03D 80/80* (2016.01)
*F16C 17/10* (2006.01)

(52) U.S. Cl.
CPC ............ *F03D 80/80* (2016.05); *F16C 17/105* (2013.01); *F05B 2240/14* (2013.01); *F16C 2360/31* (2013.01)

(56) References Cited

U.S. PATENT DOCUMENTS

| | | |
|---|---|---|
| 2002/0049108 A1 | 4/2002 | Hosle |
| 2012/0114488 A1 | 5/2012 | Giger |
| 2012/0025538 A1 | 12/2012 | Luneau et al. |
| 2015/0159631 A1* | 6/2015 | Bitsch .................. F16C 35/047 416/174 |
| 2018/0030964 A1* | 2/2018 | Eriksen ................... F16C 17/26 |
| 2018/0328347 A1* | 11/2018 | Rogg ...................... F16F 13/08 |
| 2019/0072080 A1 | 3/2019 | Lemma et al. |
| 2019/0085830 A1 | 3/2019 | Frydendal et al. |
| 2019/0195205 A1 | 6/2019 | Erikson et al. |
| 2020/0362824 A1* | 11/2020 | Kofman .................. F03D 80/50 |

FOREIGN PATENT DOCUMENTS

| | | | |
|---|---|---|---|
| CN | 109519344 A | 3/2019 | |
| CN | 109923304 A | 6/2019 | |
| DE | 102009005556 A1 | 7/2010 | |
| EP | 2754893 A1 * | 7/2014 | ............ F03B 13/264 |
| EP | 3219984 A1 | 9/2017 | |
| EP | 3252306 A1 | 12/2017 | |
| EP | 3 276 192 A1 | 1/2018 | |
| EP | 3276192 A1 | 1/2018 | |
| EP | 3460271 A1 | 1/2018 | |
| EP | 3450743 A1 | 3/2019 | |
| EP | 3460268 A1 | 3/2019 | |
| EP | 3460269 A1 | 3/2019 | |
| EP | 3460270 A1 | 3/2019 | |
| WO | WO 2018024410 A1 | 2/2018 | |
| WO | WO 2018166660 A1 | 9/2018 | |
| WO | WO 2018166663 A1 | 9/2018 | |

* cited by examiner

BEARING ARRANGEMENT FOR A WIND TURBINE AND WIND TURBINE

CROSS-REFERENCE TO RELATED APPLICATIONS

This application claims priority to European Application No. 19197448.4, having a filing date of Sep. 16, 2019, the entire contents of which are hereby incorporated by reference.

FIELD OF TECHNOLOGY

The following relates to a bearing arrangement for a wind turbine and a wind turbine.

BACKGROUND

In general, bearing arrangements of wind turbines comprise a bearing housing and a drive shaft, whereby the drive shaft is arranged within the bearing housing in an axial direction along a longitudinal axis of the bearing housing. Bearings of the bearing arrangement are arranged about the drive shaft, so that the drive shaft can be rotated within the bearing housing by a rotor of the wind turbine. Such a bearing arrangement is known from EP 3 276 192 A1, for example.

The rotating drive shaft in large wind turbines is long and has a large diameter with very tight tolerance requirements on bearing raceways. Casting and machining of such a shaft is very difficult and expensive. However, a single bearing housing is required for keeping cleanliness of the lubrication at an acceptable level. Such a bearing housing is very large in diameter, which is why it comes with complication of building a wind turbine nacelle around it. The bearing housing and the drive shaft are difficult to fit into a supply base and a transportation scheme. Hence, the size and weight of these two components makes manufacturing and assembly both expensive and limited to certain procedures.

SUMMARY

An aspect relates to a bearing arrangement for a wind turbine, which can be manufactured, transported, installed more easily, and less expensive.

According to a first aspect of embodiments of the invention, the aspect is solved by a bearing arrangement for a wind turbine comprising a bearing housing and a drive shaft, whereby the drive shaft is arranged within the bearing housing in an axial direction along a longitudinal axis of the bearing housing, the bearing arrangement further comprising a downwind bearing and an upwind bearing as radial fluid bearings, whereby the downwind bearing and the upwind bearing are arranged between the bearing housing and the drive shaft, whereby the bearing housing is formed from at least two separate bearing housing pieces, whereby the at least two separate bearing housing pieces are joined with each other and/or the drive shaft is formed from at least two separate drive shaft pieces, whereby the at least two separate drive shaft pieces are joined with each other.

Thereby, embodiments of the invention provide for a split bearing arrangement, where the bearing housing and/or the drive shaft is made in smaller pieces in contrast to a single piece. The machining, handling and assembly of these pieces is easier and less expensive compared to manufacturing and providing the drive shaft and/or the bearing housing in one single piece. With embodiments of the invention, an offline bearing arrangement assembly capability is provided, which enables the wind turbine nacelle assembly to be free of any bearing related cleanliness criteria and dedicated cranes and large assembly fixtures do not get occupied, whereby assembly flexibility is greatly enhanced.

The separate bearing housing pieces and/or the drive shaft pieces may in particular be monolithically formed. The separate bearing housing pieces and/or the drive shaft pieces may comprise a cylindrical shape. Each of the separate bearing housing pieces may comprise a length along the longitudinal axis in the range of 20% to 70%, in particular in the range of 30% to 70%, for example. Each of the separate drive shaft pieces may comprise a length along the longitudinal axis in the range of 20% to 70%, in particular in the range of 30% to 70%, for example.

The bearing housing is formed from at least three separate bearing housing pieces, whereby the at least three separate bearing housing pieces are joined with each other and/or the drive shaft is formed from at least three separate drive shaft pieces, whereby the at least three separate drive shaft pieces are joined with each other. Each of the separate bearing housing pieces may comprise a length along the longitudinal axis in the range of 10% to 50%, in particular 15% to 40%, for example. Each of the separate drive shaft pieces may comprise a length along the longitudinal axis in the range of 10% to 70%, in particular 15% to 60%, for example. A middle drive shaft piece of the drive shaft may be longer than a downwind drive shaft piece and an upwind drive shaft piece in the longitudinal direction.

Further, the separate bearing housing pieces and/or the separate drive shaft pieces comprise joining surfaces extending transversely to the longitudinal axis. The joining surfaces may extend at an angle in the range of 60° to 90°, in particular 70° to 90° and further in particular 80° to 90° transversely to the longitudinal axis. Thereby, the joints of the bearing arrangement are capable of transferring very high loads without deformation.

Moreover, the separate bearing housing pieces and/or the separate drive shaft pieces comprise flange portions joined with each other by fasteners. Thereby, very stable joints are provided. The flange portions may comprise the joining surfaces. The fasteners may be bolts, for example. The flange portions of the drive shaft pieces may extend about an entire circumference of the drive shaft pieces at its respective location. The flange portions of the bearing housing pieces do not need to extend about an entire circumference of the bearing housing pieces. Instead, they may be extending at least about 20%, or at least about 30% or at least 50% about the circumference of the bearing housing pieces at its respective location. Thereby, sufficient design freedom for providing attachment means at the bearing housing for attachment to the nacelle may be provided.

At least one of the separate bearing housing pieces comprises openings for servicing the downwind bearing and/or the upwind bearing. The openings may have an oval shape, for example. Thereby, parts of the upwind bearing and the downwind bearing, such as bearing pads, may be easily removed and replaced.

At least one of the separate bearing housing pieces comprises at least one lifting ear for lifting the bearing housing. In particular, the at least one of the separate bearing housing pieces may comprise at least two lifting ears. Thereby, the entire assembled bearing arrangement may be easily lifted by a crane.

It is moreover it is an advantage, that a static sealing is arranged between the separate drive shaft pieces. The static sealing may be an O-ring, for example. Thereby it is prevented that oil or other substances leak into the drive shaft.

The downwind bearing and the upwind bearing may comprise multiple radial bearing pads supported on the bearing housing and arranged about a circumference of the drive shaft. The radial bearing pads may be sliding radial bearing pads. The radial bearing pads may be reversibly attached to the bearing housing. Thereby, they can easily be serviced and replaced. Typically, slow rotating sliding bearings are employed in large wind turbines. These sliding bearings carry heavy wind and weight loads. For these reasons, the dimension of the individual bearing pads and the associated rotating shaft and bearing housing are significantly large both in diameter and length compared with turbines that employ roller bearings, for example. Therefore, in such a bearing arrangement, embodiments of the invention are particularly useful.

The bearing arrangement may comprise an axial bearing. The axial bearing may comprise an axial bearing stop for limiting a movement of the drive shaft in the axial direction along the longitudinal axis. The axial bearing stop may be designed integrally with the bearing housing. Further, the axial bearing stop may be formed as a protrusion extending from the bearing housing in a radial direction of the bearing housing. The axial bearing may be located at an upwind portion or downwind portion of the drive shaft. The axial bearing stop may in particular be arranged at a downwind end of the bearing housing. Multiple axial bearing pads may be, in particular reversibly, attached to the axial bearing stop. The axial bearing stop may further be arranged about an entire circumference of the bearing housing. The downwind bearing or the upwind bearing and the axial bearing may be fluidically connected to one another. The axial bearing may comprise an axial collar arranged opposite of the axial bearing stop. The axial collar may be arranged about an entire circumference of the drive shaft and/or the axial collar may extend outwards of the drive shaft. The axial collar may be integrally formed with the drive shaft.

According to a second aspect of embodiments of the invention, the object is solved by a wind turbine comprising a bearing arrangement according to any of the previous claims, whereby the wind turbine further comprises a rotor operatively connected to drive the drive shaft and a generator operatively connected to be driven by the drive shaft.

The generator may be a direct drive generator or a geared generator having a gearbox, for example. The rotor is also commonly referred to as a hub of the wind turbine. Two, three or more wind turbine blades may be attached to the rotor or hub. The wind turbine may further comprise a nacelle, which may be supported on a tower of the wind turbine. The nacelle may comprise the bearing arrangement. The bearing arrangement, in particular the bearing housing, and the generator may be attached to the nacelle and/or the tower.

BRIEF DESCRIPTION

Some of the embodiments will be described in detail, with references to the following Figures, wherein like designations denote like members, wherein.

DETAILED DESCRIPTION

Figure 1:
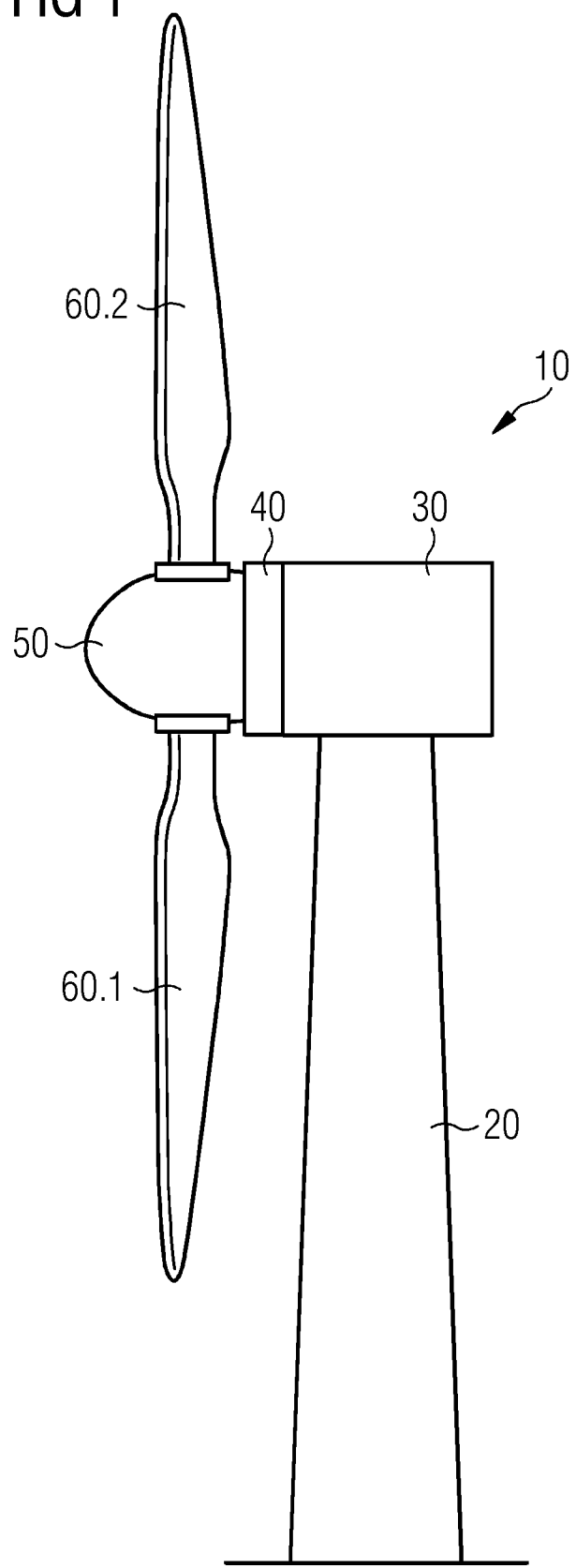
FIG. 1 shows a side view on a wind turbine.

FIG. 1 shows a side view on a wind turbine 10. The wind turbine 10 comprises a supporting tower 20 and a nacelle 30, whereby the nacelle 30 is attached to the supporting tower 20. The nacelle 30 comprises a bearing arrangement 70, which is not shown in FIG. 1 but can be seen in FIG. 2. The wind turbine 10 further comprises a generator 40 attached to a rotor 50 of the wind turbine 10. Two wind turbine blades 60.1, 60.2 are attached to the rotor 50.

Figure 2:
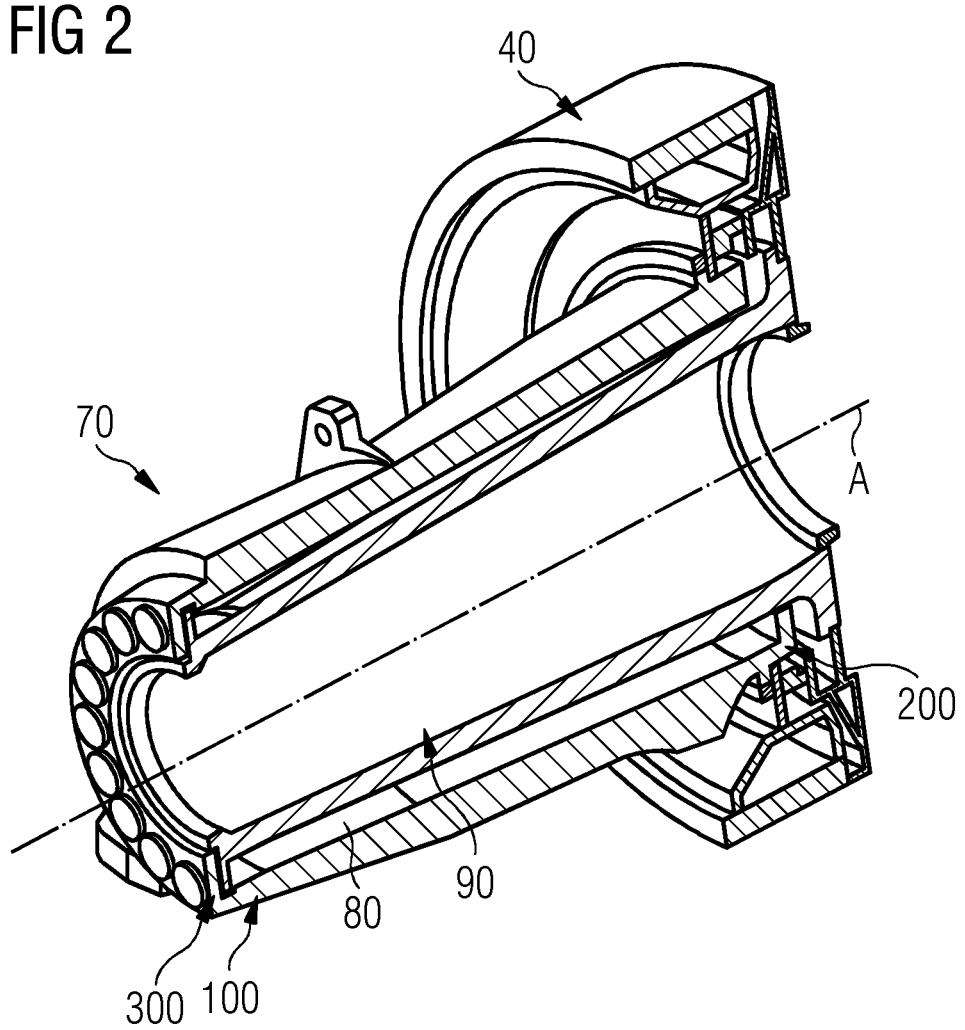
FIG. 2 shows a side perspective view on a sectional cut along the longitudinal axis of a bearing arrangement of the wind turbine of FIG. 1.

FIG. 2 shows a side perspective view on a sectional cut along the longitudinal axis A of the bearing arrangement 70 of the wind turbine 10 of FIG. 1. The bearing arrangement 70 comprises a bearing housing 80 and a drive shaft 90, whereby the drive shaft 90 is arranged within the bearing housing 80 in an axial direction along the longitudinal axis A of the bearing housing 80 as indicated in FIG. 2. The longitudinal axis A of the bearing housing 80 corresponds to the longitudinal axis A of the drive shaft 90 and thereby is a longitudinal axis A of the bearing arrangement 70. The bearing arrangement 90 further comprises a downwind bearing 100 and an upwind bearing 200 as radial fluid bearings, whereby the downwind bearing 100 and the upwind bearing 200 are arranged between the bearing housing 80 and the drive shaft 90. In particular, the downwind bearing 100 is arranged about a downwind portion of the drive shaft 90 and the upwind bearing 200 is arranged about an upwind portion of the drive shaft 90. Further, there is an axial bearing 300 arranged next to the downwind bearing 100. The drive shaft 90 is operatively connected to the generator 40. The generator 40 is shown as a direct drive generator. However, it is also possible to provide the generator 40 as a geared generator, for example.

Figure 3:
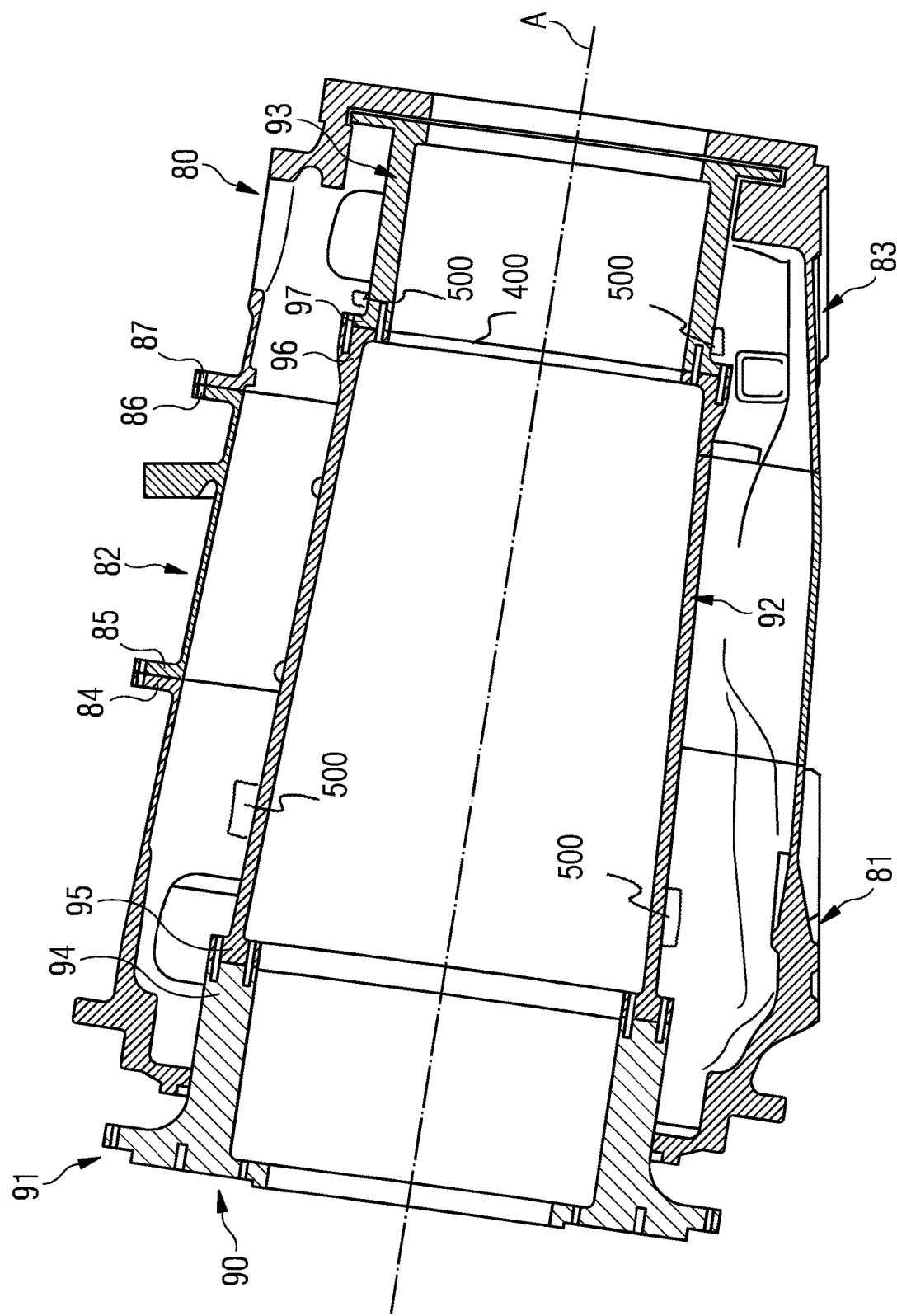
FIG. 3 shows a side view on a sectional cut along the bearing arrangement of the wind turbine of FIG. 1.

FIG. 3 a side view on a sectional cut along the bearing arrangement 70 of the wind turbine 10 of FIG. 1.

From FIG. 3 it can be taken, that the bearing housing 80 is formed from three separate bearing housing pieces 81, 82, 83. A first bearing housing piece 81 is provided at an upwind portion of the bearing housing 80. A second bearing housing piece 82 is provided at a middle portion of the bearing housing 80. A third bearing housing piece 83 is provided at a downwind portion of the bearing housing 80. The bearing housing pieces 81, 82, 83 generally have a cylindric shape. The bearing housing pieces 81, 82, 83 have joining surfaces running transverse, in particular perpendicular, to the longitudinal axis A of the bearing housing 80.

The first bearing housing piece 81 comprises a first flange portion 84 joined to a second flange portion 85 of the second bearing housing piece 82 by multiple fasteners. Further, the second bearing housing piece 82 comprises a third flange portion 86 connected to a fourth flange portion 87 of the third bearing housing piece 83 by multiple fasteners. The flange portions 84, 85, 86, 87 are extending from the bearing housing pieces 81, 82, 83 in a radial direction. The flange portions 84, 85, 86, 87 comprise the joining surfaces, at which they are respectively joined with each other.

From FIG. 3 it can further be taken, that the drive shaft 90 is formed from three separate drive shaft pieces 91, 92, 93. A first drive shaft piece 91 is provided at an upwind portion of the drive shaft 90. A second drive shaft piece 92 is provided at a middle portion of the drive shaft 90. A drive shaft piece 93 is provided at a downwind portion of the drive shaft 90. The drive shaft pieces 91, 92, 93 generally have a cylindric shape. The drive shaft pieces 91, 92, 93 have joining surfaces running transverse, in particular perpendicular, to the longitudinal axis A of the drive shaft 90.

The first drive shaft piece 91 comprises a fifth flange portion 94 joined to a sixth flange portion 95 of the second drive shaft piece 92 by multiple fasteners. Further, the second drive shaft piece 92 comprises a seventh flange portion 96 connected to an eighth flange portion 97 of the third drive shaft piece 93 by multiple fasteners. The flange portions 94, 95, 96, 97 are extending from the bearing housing pieces 91, 92, 93 in a radial direction. The flange portions 94, 95, 96, 97 comprise the joining surfaces, at which they are respectively joined with each other.

The first drive shaft piece 91 has a shorter length along the longitudinal axis A than the first bearing housing piece 81. The second drive shaft piece 92 has a greater length along the longitudinal axis A than the second bearing housing piece 82. The third drive shaft piece 93 has a shorter length along the longitudinal axis A than the third bearing housing piece 83. Further, the first bearing housing piece 81 has a greater length along the longitudinal axis A than the first drive shaft piece 91. Moreover, the third bearing housing piece 83 has a greater length along the longitudinal axis A than the third drive shaft piece 93. In general, the first and third bearing housing pieces 81, 83 may be larger than the first and third drive shaft pieces 91, 93, respectively. Thereby, possible misalignments due to load transfer can be kept very low, although the bearing housing 80 and the drive shaft 90 are not made from one single piece.

Figure 4:
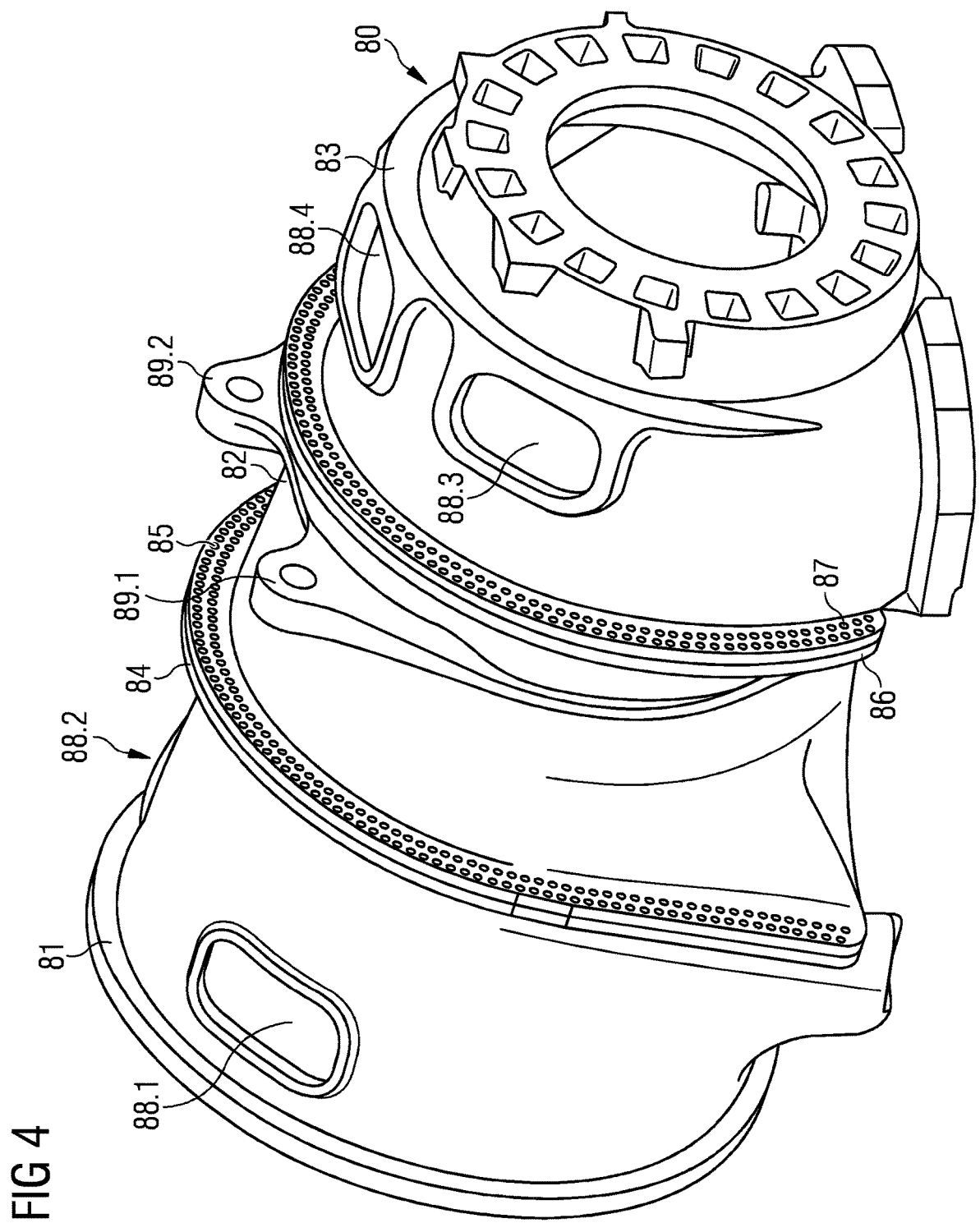
FIG. 4 shows a side perspective view on the bearing housing of the bearing arrangement of FIG. 3.

FIG. 4 shows a side perspective view on the bearing housing 80 of the bearing arrangement 70 of FIG. 3. The bearing housing 80 comprises multiple openings 88.1, 88.2, 88.3, 88.4 for servicing the downwind bearing 100 and the upwind bearing 200. A first opening 88.1 and a second opening 88.2 are formed in the first bearing housing piece 81. A third opening 88.3 and a fourth opening 88.4 are formed in the third bearing housing piece 83. Further, the bearing housing 80, in particular the second bearing housing piece 82 comprises two lifting ears 89.1, 89.2. The lifting ears 89.1, 89.2, the bearing housing 80, the entire bearing arrangement 70 or even the bearing arrangement 70 together with the nacelle 30, when the bearing arrangement 70 is fixed thereto, may be lifted by a crane, for example.

Figure 5:
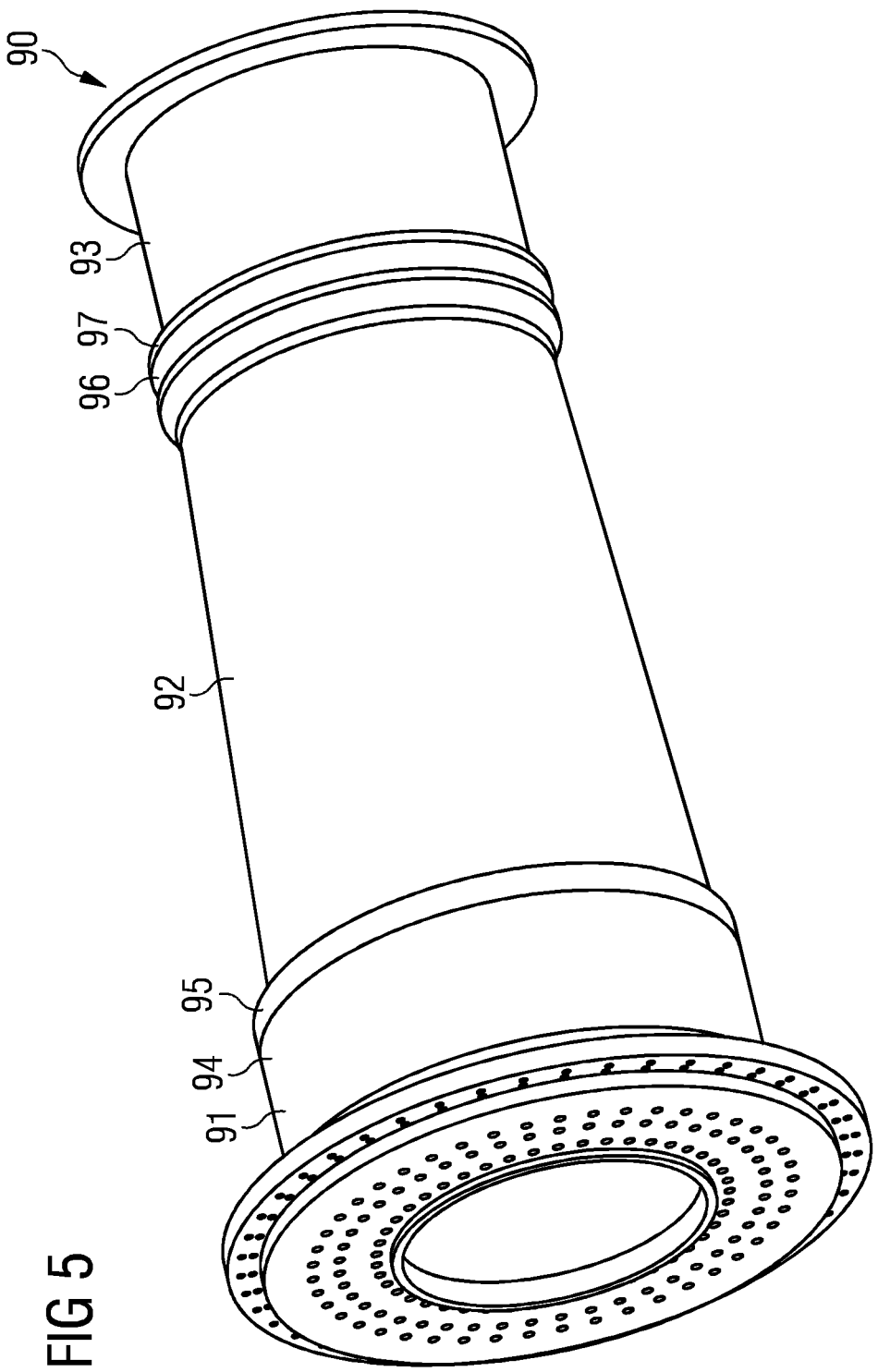
FIG. 5 shows a side perspective view on the drive shaft of the bearing arrangement of FIG. 3.

FIG. 5 shows a side perspective view on the drive shaft 90 of the bearing arrangement 70 of FIG. 3. Due to the flange portions 94, 95, 96, 97, the drive shaft 90 has an uneven circumference along its length. However, the flange portion 96 extends radially outward from the drive shaft 90 along a slope. As can be seen from the fifth flange portion 94, the flange portions do not need to extend radially outward from the drive shaft 90 but may be also provided as such within the drive shaft 90. Therefore, the thickness of the drive shaft 90 may be provided relatively large. In particular, at least one of the flange portions 94, 95, 96, 97, in particular a flange portion 94 of an upwind drive shaft piece 91, of the drive shaft 90 may be provided along the thickness of the drive shaft 90. Thereby, the load distribution of the drive shaft 90 is optimized.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A bearing arrangement for a wind turbine comprising a bearing housing and a drive shaft, wherein the drive shaft is arranged within the bearing housing in an axial direction along a longitudinal axis of the bearing housing, the bearing arrangement further comprising a downwind bearing and an upwind bearing as radial fluid bearings, wherein the downwind bearing and the upwind bearing are arranged between the bearing housing and the drive shaft, wherein, the bearing housing is formed from at least three separate bearing housing pieces, wherein the at least three separate bearing housing pieces are joined with each other, wherein each of the at least three separate bearing housing pieces comprise radially extending flange portions joined with each other by means of fasteners, wherein the drive shaft is formed from at least three separate drive shaft pieces joined with each other, and wherein at least one drive shaft piece of the at least three separate drive shaft pieces is arranged at least partially within each of the at least three separate bearing housing pieces in the axial direction along the longitudinal axis of the bearing housing.

2. The bearing arrangement according to claim 1, wherein the separate bearing housing pieces and/or the separate drive shaft pieces comprise joining surfaces extending transversely to the longitudinal axis.

3. The bearing arrangement according to claim 1, wherein the separate drive shaft pieces comprise flange portions joined with each other by fasteners.

4. The bearing arrangement according to claim 1, wherein at least one of the separate bearing housing pieces comprises openings for servicing the downwind bearing and/or the upwind bearing.

5. The bearing arrangement according to claim 1, wherein at least one of the separate bearing housing pieces comprises lifting ears for lifting the bearing housing.

6. The bearing arrangement according to claim 1, wherein the bearing arrangement comprises an axial bearing.

7. A wind turbine comprising the bearing arrangement according to claim 1, wherein the wind turbine further comprises a rotor operatively connected to drive the drive shaft and a generator operatively connected to be driven by the drive shaft.

* * * * *